United States Patent [19]

Wilhelm

[11] Patent Number: 4,811,754

[45] Date of Patent: Mar. 14, 1989

[54] RINSE WATER VALVE FOR VACUUM TOILET SYSTEM

[75] Inventor: Raymond L. Wilhelm, Orange, Calif.

[73] Assignee: Oy Wärtsilä Ab, Helsinki, Finland

[21] Appl. No.: 22,882

[22] Filed: Mar. 6, 1987

[51] Int. Cl.$^4$ ............... F16K 31/02; F16K 31/22; F16K 33/00

[52] U.S. Cl. .................. 137/218; 137/389; 137/433; 137/410; 4/316; 4/321; 251/129.21

[58] Field of Search ............ 137/192, 205, 217, 218, 137/389, 390, 430, 433, 410, 412; 4/316, 321, 407, 423; 251/129.21

[56] References Cited

U.S. PATENT DOCUMENTS

| | | | |
|---|---|---|---|
| 1,310,560 | 7/1919 | Cook | 137/433 |
| 1,633,581 | 6/1927 | Gordon et al. | 137/433 |
| 1,914,541 | 6/1933 | Teesdale | 137/389 |
| 1,987,981 | 1/1935 | Tice | 137/412 |
| 2,022,430 | 11/1935 | Nold | 137/390 |
| 3,101,570 | 8/1963 | Lienard | 137/433 |
| 3,125,321 | 3/1964 | Van Domelen | 251/129.21 |
| 3,462,116 | 8/1969 | Wright, Jr. | 251/129.21 |
| 3,759,281 | 9/1973 | Falcuta | 137/433 |
| 3,796,227 | 3/1974 | Fujiwara | 137/390 |
| 3,820,757 | 6/1974 | Siebel | 251/129.21 |
| 4,063,315 | 12/1977 | Carolan et al. | 4/316 |
| 4,214,324 | 7/1980 | Kemper et al. | 4/316 |
| 4,296,778 | 10/1981 | Anderson | 137/433 |
| 4,335,734 | 6/1982 | Trinkwalder | 137/390 |
| 4,357,719 | 11/1982 | Badger et al. | 4/316 |
| 4,638,973 | 1/1987 | Torrence | 251/129.21 |
| 4,713,847 | 12/1987 | Oldfelt et al. | 4/316 |

FOREIGN PATENT DOCUMENTS 2853537  6/1979  Fed. Rep. of Germany .......... 4/321

*Primary Examiner*—George L. Walton
*Attorney, Agent, or Firm*—Dellett, Smith-Hill and Bedell

[57] ABSTRACT

A fluid-flow control valve comprises a valve housing bounding a chamber and defining an inlet port for entry of fluid into the chamber and a control port for egress of fluid from the chamber. The control port is of reduced cross-sectional area relative to the chamber. The valve also comprises a valve closure member disposed in the chamber. The valve closure member is less dense than the fluid that the valve is to be used to control, so that when the chamber contains that fluid and the control port is above the closure member, the valve closure member is urged toward the control port so as to obstruct the control port. The closure member can be displaced away from the control port so as to allow fluid to flow through the control port.

7 Claims, No Drawings

RINSE WATER VALVE FOR VACUUM TOILET SYSTEM

This invention relates to a rinse water valve for a vacuum toilet system.

BACKGROUND OF THE INVENTION

It has for many years been conventional to use recirculating toilet systems in aircraft because a relatively large amount of liquid is required to transport the waste material in a gravity toilet system, and by recirculating the liquid the total quantity of liquid required to operate the system is reduced. Recirculating toilet systems are subject to the disadvantage that the recirculating liquids that they employ are corrosive, and therefore leakage from a recirculating toilet system may enable the corrosive liquid to contact structural members of the aircraft, resulting in the structural integrity of the aircraft being impaired.

Vacuum toilet systems have been known for many years. The modern vacuum toilet system comprises a waste-receiving bowl, a sewer pipe that can be placed under a pressure that is substantially lower than that in the interior of the waste-receiving bowl, and a discharge valve for controlling passage of material from the waste-receiving bowl into the sewer pipe. When the discharge valve is opened, material in the waste-receiving bowl is transported into the sewer pipe by virtue of the pressure difference between the interior of the waste-receiving bowl and the interior of the sewer pipe. Material that enters the sewer pipe by way of the discharge valve is transported through the sewer pipe to a container. The system also comprises a source of pressurized rinse liquid and a rinse liquid valve for controlling introduction of rinse liquid into the waste-receiving bowl.

Vacuum toilet systems do not lend themselves to recirculation, because of the large pressure difference between the downstream side of the discharge valve and the upstream side of the rinse liquid valve. However, because vacuum toilet systems rely on vacuum for removal of the waste material from the bowl, the amount of rinse liquid that is needed in a vacuum toilet system is much smaller than the amount of rinse liquid required in a gravity toilet system. Consequently, non-recirculating vacuum toilet systems employing water as rinse liquid are attractive for use in aircraft.

When a vacuum toilet system is installed in a passenger aircraft, it is conventional for the rinse liquid to be provided from the aircraft's potable water system. The potable water system includes a tank which is positioned below the aircraft's passenger deck, pipes connecting the tank to the consuming devices, such as the galleys and toilets, and a pump for maintaining the water in the pipes under pressure. It is necessary from time to time to drain the potable water system and refill it.

The rinse water valve that is conventionally used in an aircraft vacuum toilet system has a valve closure member which is positioned in a control chamber for cooperating with a seat which surrounds a control port at the bottom of the control chamber. In normal operation of the rinse water valve, a solenoid is energized to bring about movement of the closure member away from the seat, so that the rinse water is allowed to flow through the control port. On de-energizing the solenoid, the pressure drop in the control chamber due to flow past the closure member causes the closure member to be displaced into engagement with the seat. In order to facilitate pressurization of the branch pipe leading to the rinse water valve after the potable water system has been drained and refilled, the closure member is biased away from the valve seat by a light spring. Therefore, as the potable water system is pressurized, air is able to escape from the branch pipe by way of the control port. When the control chamber is filled with water, continued flow past the closure member creates a pressure drop which causes the valve to close against the bias provided by the spring.

It has been found in practice that this type of rinse water valve is not satisfactory, because if the rate of flow of water through the control chamber containing the closure member is small, the pressure drop past the closure member might not be sufficient to overcome the bias of the spring, with the result that the valve does not close. Consequently, water flows through the control port and into the waste-receiving bowl until the malfunction of the valve is detected and remedied. Unless the discharge valve is open, the water that enters the bowl cannot leave the bowl except by overflowing.

SUMMARY OF THE INVENTION

A preferred embodiment of the present invention is a fluid-flow control valve comprising a valve housing bounding a chamber and defining an inlet port for entry of fluid into the chamber and a control port for egress of fluid from the chamber. The control port is of reduced cross-sectional area relative to the chamber. The valve also comprises a valve closure member disposed in the chamber. The valve closure member is less dense than the fluid that the valve is to be used to control, so that when the chamber contains that fluid and the control port is above the closure member, the valve closure member is urged toward the control port so as to obstruct the control port. The closure member can be displaced away from the control port so as to allow fluid to flow through the control port.

BRIEF DESCRIPTION OF THE DRAWINGS

For a better understanding of the invention, and to show how the same may be carried into effect, reference will now be made, by way of example, to the accompanying drawings in which:

FIG. 1 illustrates diagramatically a portion of a passenger aircraft, and

FIG. 2 is a sectional view of a fluid-control valve embodying the present invention.

DETAILED DESCRIPTION

FIG. 1 illustrates a potable water tank 200 which is mounted inside the fuselage of a passenger aircraft beneath the principal passenger deck 202. It will be appreciated that the aircraft might have an additional passenger deck above the deck 202, but this is not shown in FIG. 1. On the deck 202 are water consuming units such as a galley 206. A main pipe 210 extends from the tank 200, and has a branch pipe 212 which extends to the galley 206 and is provided with a control valve 216. An air compressor 230 is connected to the tank to introduce air under pressure into the tank 200 and pressurize the tank and the main and branch pipes. When the control valve 216 is opened and allows water to flow from the branch pipe 212, the pressure of air in the tank 200, which is maintained by the compressor 230, displaces water from the tank into the pipe 210 and sustains the flow.

The aircraft also includes at least one toilet compartment 208 equipped with a vacuum toilet. The vacuum toilet comprises a waste-receiving bowl 250 which defines an interior space for receiving waste material and has an outlet opening 252. The outlet opening is connected to one side of a discharge valve 256. The opposite side of the discharge valve is connected through a sewer pipe 257 to a holding tank 258. The discharge valve 256 controls flow of material from the bowl 252 to the pipe 257 and the tank 258. An electrically driven blower 260 is connected to the tank 258 for establishing a partial vacuum in the tank. The tank is also provided with a valve 262 or similar means for emptying the tank. A duct 264 provides communication between the interior space of the tank and the ambient atmosphere, subject to the action of a check valve 265.

A rinse water supply pipe 266 opens into the bowl 250 by way of a spray nozzle arrangement adjacent the rim of the bowl 250. The rinse water supply pipe 266 is connected to the pipe 210. A remote-controlled, solenoid-operated, rinse water valve 270 is connected in the water supply pipe 266. A vacuum breaker valve 271 is disposed downstream of the valve 270, to prevent reverse flow in the pipe 266 in the event that the pressure upstream of the valve 271 falls below the pressure in the waste-receiving bowl.

Details concerning the manner of operation of the vacuum toilet system are disclosed in co-pending U.S. patent application Ser. No. 07/009,709 filed Feb. 2, 1987, the disclosure of which is hereby incorporated by reference herein. The rinse water valve and the vacuum breaker valve are illustrated in further detail in FIG. 2.

The valve illustrated in FIG. 2 comprises a valve housing 2 in which is formed a control chamber 4. Water under pressure is introduced into the chamber 4 by way of an inlet port 6 defined by an inlet fitting 8 and leaves the chamber by way of a control port 10 formed in a housing wall 44. Located inside the chamber 4 is a float assembly 12. The float assembly comprises a cylindrical body 14 of rigid foam material such as polyurethane and a metal guide rod 16 which extends axially through and beyond the body 14. The lower end of the rod 16 is received slidably in a hole 18 formed at the center of a spider plate 20. The spider plate is positioned above the inlet fitting 8 and is retained in the control chamber 4 on removal of the inlet fitting 8 by threaded engagement with the peripheral wall of the chamber. The inlet fitting 8 supports a pleated disk filter 22 which is positioned below the spider plate 20. Intermediate its ends, the rod 16 is formed with an annular flange 26 which extends over the upper surface of the body 14. A substantially annular sealing member 28 of synthetic rubber is attached to the upper surface of the flange 26. The upper end of the rod 16 extends upwards through the control port 10 into a discharge chamber 32, and is received with a sliding fit in a sleeve 24 at the lower end of an actuator tube 34. The actuator tube 34 defines an interior passage 36. The passage 36 is in open communication with the chamber 12 by way of bores 38 in the transition between the sleeve 24 and the tube 34. The actuator tube 34 has a peripheral flange 40, and a helical compression spring 42 is effective between the flange 40 and the housing wall 44 to urge the actuator tube 34 and the sleeve 24 upwards.

A solenoid assembly 60 is attached to the valve housing 2 above the control port 10. The solenoid assembly comprises a solenoid 64 which is wound on a generally cylindrical former 68 and has terminals (not shown) which can be connected to a source of DC voltage by way of a control switch (not shown). The former 68 is made of corrosion-resistant metal and is fitted over a tubular armature 72 of soft magnetic material such as 430F stainless steel. A tubular armature stop 76, which is of low magnetic reluctance, is formed with an axial passage within which the actuator tube 34 extends. Therefore, when the solenoid is energized, the magnetic flux generated by the solenoid is concentrated within an air gap 80 and pulls the armature 72 towards the armature stop 76. When the armature 72 engages the armature stop 76, a coating of electroless nickel (not shown) on the armature maintains a gap of high reluctance in the magnetic circuit containing the armature. This ensures that when the solenoid 64 is de-energized and the electromagnetic field created by the solenoid collapses, the residual magnetism in the materials does not hold the armature in contact with the armature stop against the force of the spring 42. The armature 72 is formed with an axial passage 82 which is slightly narrower than the passage in the armature stop 76, and therefore provides a shoulder 84 at its lower end which limits upward movement of the actuator tube 34 and allows the armature 72 to push against the tube 34 and push the rod 16 downwards so that the control port 10 is opened.

At its upper end, the passage 82 opens into a vacuum breaker chamber 86. The chamber 86 is generally cylindrical, and is closed at its top by a plug 100 which is formed with a vent hole 102. The chamber 86 contains a poppet 88. The poppet 88 has a cylindrical skirt 90 which is formed with apertures 98 and is fitted slidingly with a small clearance in a cylindrical bore at the upper end of the former 68. Above the skirt 90 is a peripheral flange 92, and an O-ring 94 is carried by the poppet above the flange. A sleeve 96 extends upwards from the flange 92 and is fitted slidingly in a cylindrical bore in the plug 100. Apertures 99 are formed in the sleeve 96. A helical compression spring 104 is effective between the plug 100 and the poppet 88, pushing the poppet downwards. At its side, the chamber is provided with an outlet fitting 106, defining an outlet port 108. The outlet port communicates with the spray nozzle arrangement of the vacuum toilet by way of a pipe which extends downwards from the outlet fitting. The spray nozzle arrangement is disposed below the port 108.

When the potable water system incorporating the FIG. 1 valve has been drained and is to be refilled and pressurized, the solenoid is de-energized and the spring 42 holds the actuator tube 34 in its upper position. The float assembly rests in the spider plate 20, with the upper end 30 of the rod 16 extending partially into the sleeve 24. Therefore, the sealing member 26 does not engage the seat around the control port 10. The level of water in the branch pipe connected to the inlet connection 8 rises, displacing air from the pipe. The air is able to escape from the pipe by passing through the inlet connection 8 and the chamber 4, the port 10, the chamber 32, the bores 38, the passages 36 and 82, the chamber 86, the apertures 98 and the outlet port 108, because the control port 10 is open and the pressure of air being displaced by the water entering the branch pipe pushes the poppet 88 upwards against the force of the spring 104 and clears the apertures 98. When the water level is above the spider plate 20, the float assembly is raised and the port 10 is blocked, as shown on the left side of FIG. 2. The upper end 30 of the actuator rod is then fully inserted in the sleeve 24. Movement of the float assembly is guided by engagement of the rod 16 in the hole 18 and the sleeve 24. If then the solenoid is energized, the actuator tube 34 and the sleeve 24 are driven downwards as shown on the right of FIG. 2. The float assembly 12 is driven downwards and the port 10 is opened, allowing water to flow through the port 10. The water pressure displaces the poppet 88 upwards, sealing the vent hole 102 by means of the O-ring 94, and water is able to leave the valve by way of the apertures 98 and the outlet port 108. Engagement of the O-ring 94 with the plug 100 seals the vent hole 102 and prevents water from escaping by way of the vent hole. When the solenoid is de-energized, the float assembly rises and the control port 10 is closed once more. The poppet 88 is driven down by the spring 104 and the holes 99 are cleared, placing the vent hole 102 in communication with the outlet port 108 and allowing water on the downstream side of the poppet 88 to drain into the bowl by way of the spray nozzle arrangement. The poppet 88, the fitting 106 and the upper end of the former 68 are configured so that no water remains between the poppet 88 and the port 108.

When the potable water system is drained, the negative head created by the water in the branch pipe 266 and the main pipe 210 pulls the float assembly 12 down. Air enters the chamber 4 by way of the vent hole 102 and the clearance between the skirt 90 and the upper end of the former 68, allowing water upstream of the poppet 88 with respect to the normal flow direction to drain into the potable water tank. The flow resistance encountered by air entering the vacuum breaker valve by way of the vent hole 102 is less than that in the path of air entering by way of the port 108, and consequently there is no danger of contaminants entering the potable water system by way of the spray nozzle arrangement.

Since a spring is not used to bias the float assembly toward the open position, and the float is biased towards the closed position by its own buoyancy and not by pressure drop past the float, closing of the valve is more reliable than in the conventional rinse water valve described previously.

It will be appreciated that the present invention is not restricted to the particular embodiment that has been described and illustrated, and that variations may be made therein without departing from the scope of the invention as defined in the appended claims and equivalents thereof. For example, it is not necessary for the valve assembly to include a vacuum breaker valve as an integral component thereof.

I claim:

1. A liquid-flow control valve assembly for controlling flow of a selected liquid, comprising
   a valve housing having wall means bounding a control chamber, said wall means including a first wall portion formed with an inlet port for entry of fluid into the control chamber and a second wall portion formed with a control port for egress of fluid from the control chamber, the control port being of reduced cross-section area relative to the control chamber, and the valve housing also defining a discharge chamber on the opposite side of the second wall portion from the control chamber,
   a valve closure member which is less dense than said selected liquid and is disposed in the control chamber so that when the control chamber contains said selected liquid and the control port is above the valve closure member, the valve closure member is urged by its buoyancy towards the control port so as to obstruct the control port,
   an elongate actuator member which extends through the control post and engages the valve closure member for displacing the valve closure member away from the control port so as to allow fluid to flow through the control port, the actuator member having a tubular portion which defines an interior space and being formed with at least one aperture providing communication between the discharge chamber and said interior space,
   a solenoid which is disposed on the opposite side of the second wall portion from the control chamber and defines an elongate guide passage,
   a generally cylindrical armature which is formed with a through passage in open communication with the interior space of the tubular portion of the actuator member and is fitted in the guide passage for movement therein longitudinally of the guide passage, and
   a vacuum breaker valve mounted on the solenoid and comprising a vacuum breaker valve housing defining an inlet port which is in open communication with the through passage of the armature, an outlet port, and a passage which extends from the inlet port of the vacuum breaker valve housing towards the outlet port thereof, and the vacuum breaker valve also comprising pressure-responsive means for controlling flow of fluid through the passage defined by the vacuum breaker valve housing, such that when the pressure of the fluid at the inlet port of the vacuum breaker valve housing exceeds that at the outlet port thereof by a predetermined amount, fluid is able to flow through the passage to the outlet port of the vacuum breaker valve housing, whereas when the pressure of fluid at the inlet port of the vacuum breaker valve housing falls, the outlet port of the vacuum breaker valve housing is isolated from the inlet port thereof.

2. A valve assembly according to claim 1, comprising a spring which is effective between the second wall portion and the actuator member for urging the actuator member into engagement with the armature.

3. A valve assembly according to claim 2, comprising an armature stop which is fitted in the guide passage of the solenoid for limiting movement of the armature towards the discharge chamber, the armature stop being generally cylindrical and defining an inner guide passage within which the tubular portion of the actuator member extends.

4. A valve assembly according to claim 1, wherein the passage defined by the vacuum breaker valve housing is generally cylindrical, and the pressure-responsive means comprise a generally cylindrical poppet member which is fitted in the generally cylindrical passage and has an end face which is presented towards the solenoid and a peripheral surface which is presented towards the exterior of the generally cylindrical passage, the poppet member being biased towards the armature and being formed with a passage which enters the poppet member at its end face and opens at its peripheral surface, so that when pressure of fluid at the inlet port of the vacuum breaker valve housing displaces the poppet member away from the solenoid, fluid is able to flow through the passage in the poppet member to the outlet port of the vacuum breaker valve, whereas when the pressure of fluid at the inlet port of the vacuum breaker valve housing falls, the outlet port of the vacuum breaker valve housing is isolated from the inlet port of the vacuum breaker valve housing.

5. A valve assembly according to claim 1, wherein the guide passage defines an aperture at an end thereof that is remote from the control port, and the inlet port of the vacuum breaker valve substantially coincides with the aperture defined by the guide passage.

6. A valve assembly according to claim 1, wherein the guide passage defines an aperture at an end thereof that is remote from the control port, and the inlet port of the vacuum breaker is substantially coaxial with the aperture defined by the guide passage.

7. A valve assembly according the claim 1, wherein the valve closure member obstructs the control port by engaging said second portion of the wall means.

* * * * *

UNITED STATES PATENT AND TRADEMARK OFFICE
CERTIFICATE OF CORRECTION

PATENT NO. : 4,811,754

DATED : March 14, 1989

INVENTOR(S) : Raymond L. Wilhelm

It is certified that error appears in the above-identified patent and that said Letters Patent is hereby corrected as shown below:

The Title Page should be deleted to appear as shown on the attached sheet.

On the title page, "7 Claims No Drawings" should read -- 7 Claims 2 Drawing Sheets --.

Signed and Sealed this

Twenty-ninth Day of August, 1989

Attest:

DONALD J. QUIGG

Attesting Officer

Commissioner of Patents and Trademarks

United States Patent [19]

Wilhelm

[11] Patent Number: 4,811,754
[45] Date of Patent: Mar. 14, 1989

[54] RINSE WATER VALVE FOR VACUUM TOILET SYSTEM

[75] Inventor: Raymond L. Wilhelm, Orange, Calif.

[73] Assignee: Oy Wärtsilä Ab, Helsinki, Finland

[21] Appl. No.: 22,882

[22] Filed: Mar. 6, 1987

[51] Int. Cl.⁴ .................. F16K 31/02; F16K 31/22; F16K 33/00
[52] U.S. Cl. .................. 137/218; 137/389; 137/433; 137/410; 4/316; 4/321; 251/129.21
[58] Field of Search ............. 137/192, 205, 217, 218, 137/389, 390, 430, 433, 410, 412; 4/316, 321, 407, 423; 251/129.21

[56] References Cited

U.S. PATENT DOCUMENTS

| 1,310,560 | 7/1919 | Cook | 137/433 |
|---|---|---|---|
| 1,633,581 | 6/1927 | Gordon et al. | 137/433 |
| 1,914,541 | 6/1933 | Teesdale | 137/389 |
| 1,987,981 | 1/1935 | Tice | 137/412 |
| 2,022,430 | 11/1935 | Nold | 137/390 |
| 3,101,570 | 8/1963 | Lienard | 137/433 |
| 3,125,321 | 3/1964 | Van Domelen | 251/129.21 |
| 3,462,116 | 8/1969 | Wright, Jr. | 251/129.21 |
| 3,759,281 | 9/1973 | Falcuta | 137/433 |
| 3,796,227 | 3/1974 | Fujiwara | 137/390 |
| 3,820,757 | 6/1974 | Siebel | 251/129.21 |
| 4,063,315 | 12/1977 | Carolan et al. | 4/316 |
| 4,214,324 | 7/1980 | Kemper et al. | 4/316 |
| 4,296,778 | 10/1981 | Anderson | 137/433 |
| 4,335,734 | 6/1982 | Trinkwalder | 137/390 |
| 4,357,719 | 11/1982 | Badger et al. | 4/316 |
| 4,638,973 | 1/1987 | Torrence | 251/129.21 |
| 4,713,847 | 12/1987 | Oldfelt et al. | 4/316 |

FOREIGN PATENT DOCUMENTS 2853537  6/1979  Fed. Rep. of Germany ......... 4/321

Primary Examiner—George L. Walton
Attorney, Agent, or Firm—Dellett, Smith-Hill and Bedell

[57] ABSTRACT

A fluid-flow control valve comprises a valve housing bounding a chamber and defining an inlet port for entry of fluid into the chamber and a control port for egress of fluid from the chamber. The control port is of reduced cross-sectional area relative to the chamber. The valve also comprises a valve closure member disposed in the chamber. The valve closure member is less dense than the fluid that the valve is to be used to control, so that when the chamber contains that fluid and the control port is above the closure member, the valve closure member is urged toward the control port so as to obstruct the control port. The closure member can be displaced away from the control port so as to allow fluid to flow through the control port.

7 Claims, No Drawings

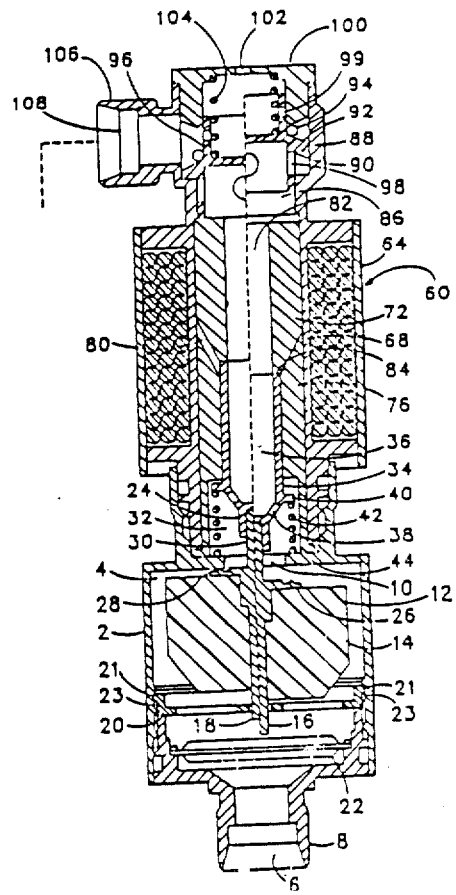

UNITED STATES PATENT AND TRADEMARK OFFICE
CERTIFICATE OF CORRECTION

PATENT NO. : 4,811,754

DATED : March 14, 1989

INVENTOR(S) : RAYMOND L. WILHELM

It is certified that error appears in the above-identified patent and that said Letters Patent is hereby corrected as shown below:

FIGS. 1 and 2 shown below should be included in the patent.

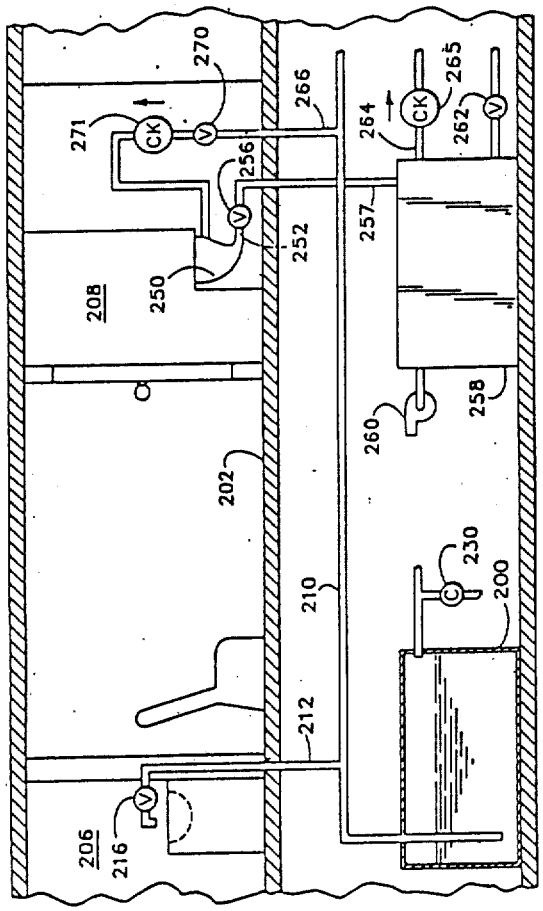

FIG.1

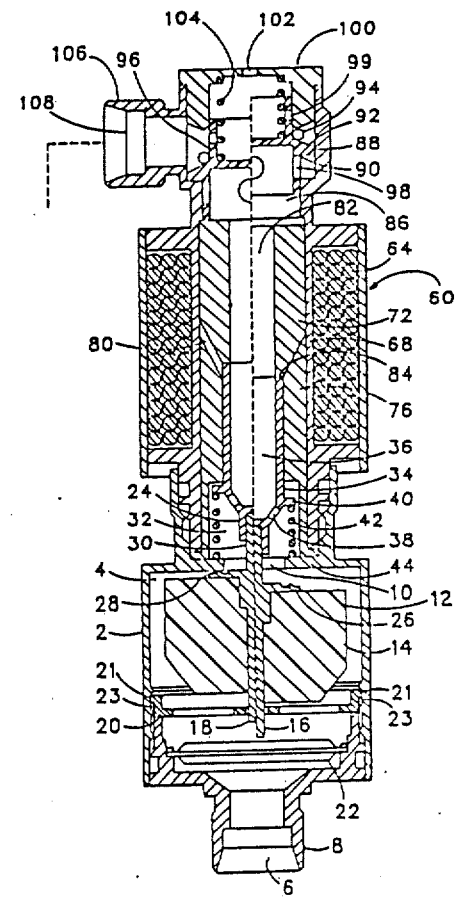

FIG.2